United States Patent

Blackburn et al.

[11] Patent Number: 5,965,240
[45] Date of Patent: Oct. 12, 1999

[54] METAL/COMPOSITE

[75] Inventors: Louis Blackburn, Wallingford; Christopher J. Hertel, Wethersfield; John J. Klein, Coventry; Joseph J. Parkos, Jr., East Haddam, all of Conn.

[73] Assignee: United Technologies Corporation, Hartford, Conn.

[21] Appl. No.: 09/088,470

[22] Filed: Jun. 1, 1998

Related U.S. Application Data

[63] Continuation of application No. 08/654,880, May 29, 1996, Pat. No. 5,876,651.

[51] Int. Cl.$^6$ .............................. B32B 3/02; B32B 15/08; B32B 27/08; B32B 5/28

[52] U.S. Cl. ................. 428/192; 428/297.4; 428/300.7; 428/301.1; 428/301.4; 428/343; 428/355 EN; 428/413; 428/418; 428/421; 428/422; 428/457; 442/179; 416/223 R; 416/224; 416/229 R; 416/230; 416/241 R; 416/241 A

[58] Field of Search ................... 428/192, 297.4, 428/299.1, 300.7, 301.4, 301.1, 413, 422, 421, 457, 418, 343, 355 EN; 416/223 R, 224, 229 R, 230, 241 R, 241 A; 442/179

[56] References Cited

U.S. PATENT DOCUMENTS

| | | | |
|---|---|---|---|
| 5,141,400 | 8/1995 | Murphy et al. | 416/204 A |
| 5,439,353 | 8/1995 | Cook et al. | 426/230 |
| 5,449,273 | 9/1995 | Hertel et al. | 416/224 |
| 5,486,096 | 1/1996 | Hertel et al. | 416/224 |
| 5,786,285 | 7/1998 | Walla et al. | 442/397 |

FOREIGN PATENT DOCUMENTS

| | | |
|---|---|---|
| 0351447 | 1/1990 | European Pat. Off. . |
| 0496550 | 7/1992 | European Pat. Off. . |

*Primary Examiner*—Vivian Chen
*Attorney, Agent, or Firm*—Bachman & LaPointe, P.C.

[57] ABSTRACT

A composite article comprising of a non-metallic composite core, a fluoroelastomer adhesive layer which has a curing temperature substantially similar to the composite core, and a metallic structure which overlays the fluoroelastomer adhesive layer, wherein the composite article can be formed by co-curing the core and the fluoroelastomer adhesive layer.

9 Claims, 2 Drawing Sheets

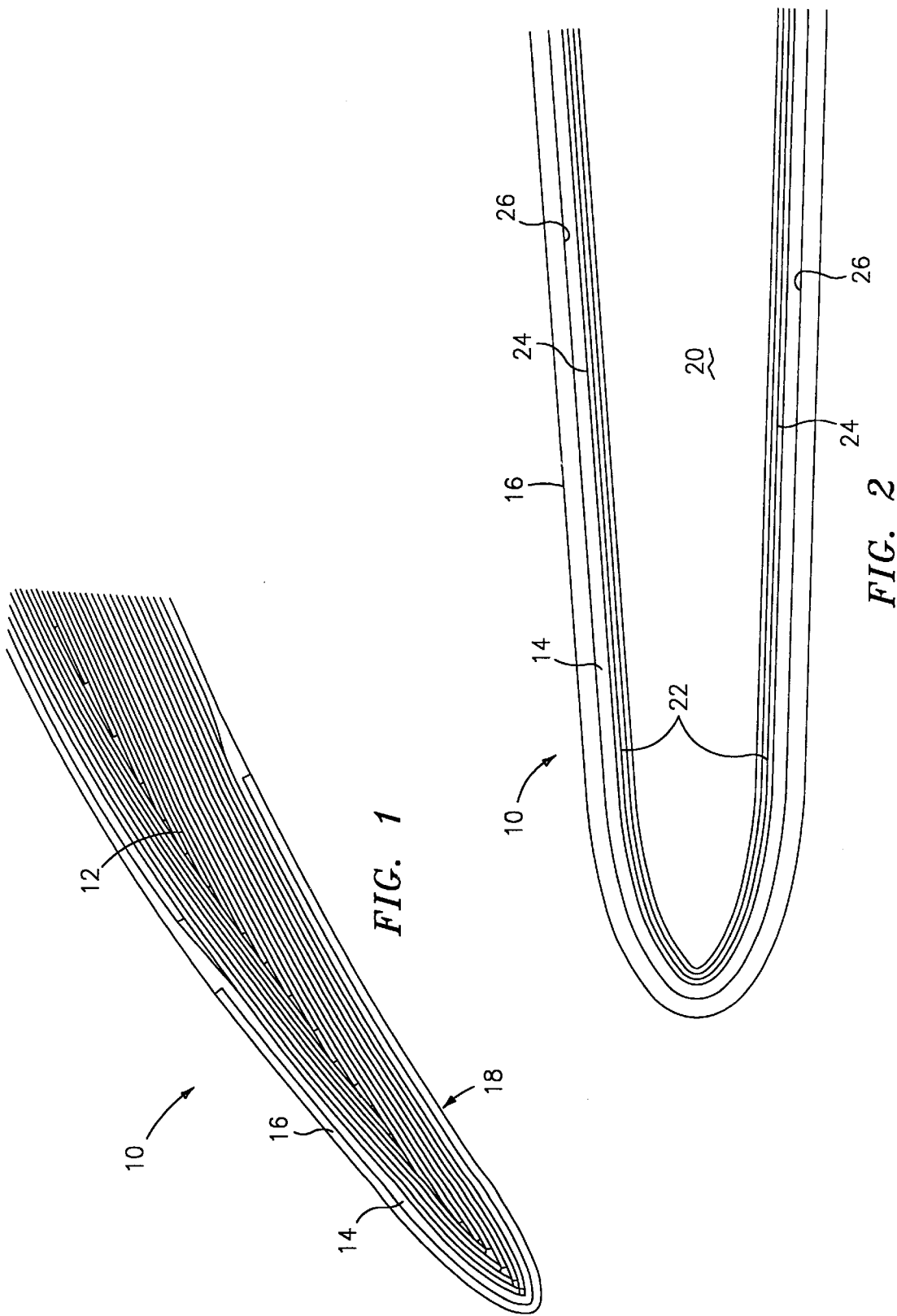

METAL/COMPOSITE

This is a Division, of application Ser. No. 08/654,880, filed May 29, 1996, U.S. Pat. No. 5,876,651.

BACKGROUND OF THE INVENTION

The present invention relates to a method for providing a composite structure having improved protection against erosion and foreign object damage and the composite article formed thereby. The method of the present invention has particular utility in the manufacture and refurbishment of airfoil structures.

Composite airfoil structures such as the fan exit guide vane on a jet engine are subject to erosion from atmospheric effects as well as from damage resulting from the impingement of foreign objects on the leading edge of the vane. Efforts have been made to find suitable techniques for repairing these airfoil structures. There remains a need however for a method of refurbishment which yields a well bonded structure having the desired protection against erosion and foreign object damage.

SUMMARY OF THE INVENTION

Accordingly, it is an object of the present invention to provide a method for refurbishing the leading edge of a composite structure such as an airfoil structure.

It is a further object of the present invention to provide a method as above which is economically beneficial and eliminates the need for secondary bonding operations.

It is yet a further object of the present invention to provide a method as above which improves the erosion and foreign object damage protection on the leading edge of the composite structure.

It is still a further object of the present invention to provide a method as above which also lends itself to the formation of original metal/composite structures.

It is yet a further object of the present invention to provide a well bonded composite structure.

The foregoing objects are attained by the method of the present invention.

In accordance with the present invention, a novel method for forming a composite structure is presented. The method comprises the steps of: providing a core structure formed from a non-metallic material in an uncured or substantially uncured state; applying a fluoroelastomer film, also preferably in an uncured or substantially uncured state and having a cure temperature which closely matches the cure temperature of the core structure material, over surface portions of said core structure; placing a metallic structure over a portion of said core structure so that inner surfaces of said metallic structure contact said fluoroelastomer film; and molding said composite structure under conditions of heat and pressure for a time sufficient to co-cure said non-metallic core structure material and said fluoroelastomer film and to form a bond between said metallic structure and said fluoroelastomer film. In a preferred embodiment, a temperature of up to about 360° F. (182° C.) and a pressure of from about 100 psi (7 kg/cm$^2$) to about 1000 psi (70 kg/cm$^2$) are applied to the composite structure for about 30 minutes during the co-curing and bonding operation.

It has been found that a particularly strong bond is formed during the method of bonding if the metallic structure is prepared by cleaning the inner surfaces with a solvent such as an isopropyl alcohol solution, etching the metallic structure in a ferric chloride acid etching solution to remove unwanted oxides and other deleterious materials from the inner surfaces, and priming said inner surfaces of said metallic structure to prevent the creation of new oxides and improve the bonding characteristics of the surfaces. The priming step preferably comprises applying an epoxy resin solution containing an insoluble corrosion inhibitor such as strontium chromate to said surfaces.

The method of the present invention has been found to have particular utility in the refurbishment of airfoil structures such as fan exit guide vanes used in jet engines. It also has utility in the manufacture of original equipment and the formation of metal/composite structures. The method of the present invention has been found to be excellent technology for bonding to stainless steel—something which has been quite difficult in the past.

Other details of, as well as other objects and advantages attendant to, the method of the present invention are set forth in the following detailed description and the accompanying drawing(s) wherein like reference numerals depict like elements.

BRIEF DESCRIPTION OF THE DRAWINGS

FIG. 1 illustrates a cross sectional view of a portion of a composite airfoil structure;

FIG. 2 illustrates an enlarged cross sectional view of the leading edge of a composite structure;

DETAILED DESCRIPTION OF THE PREFERRED EMBODIMENT(S)

Figure 3:
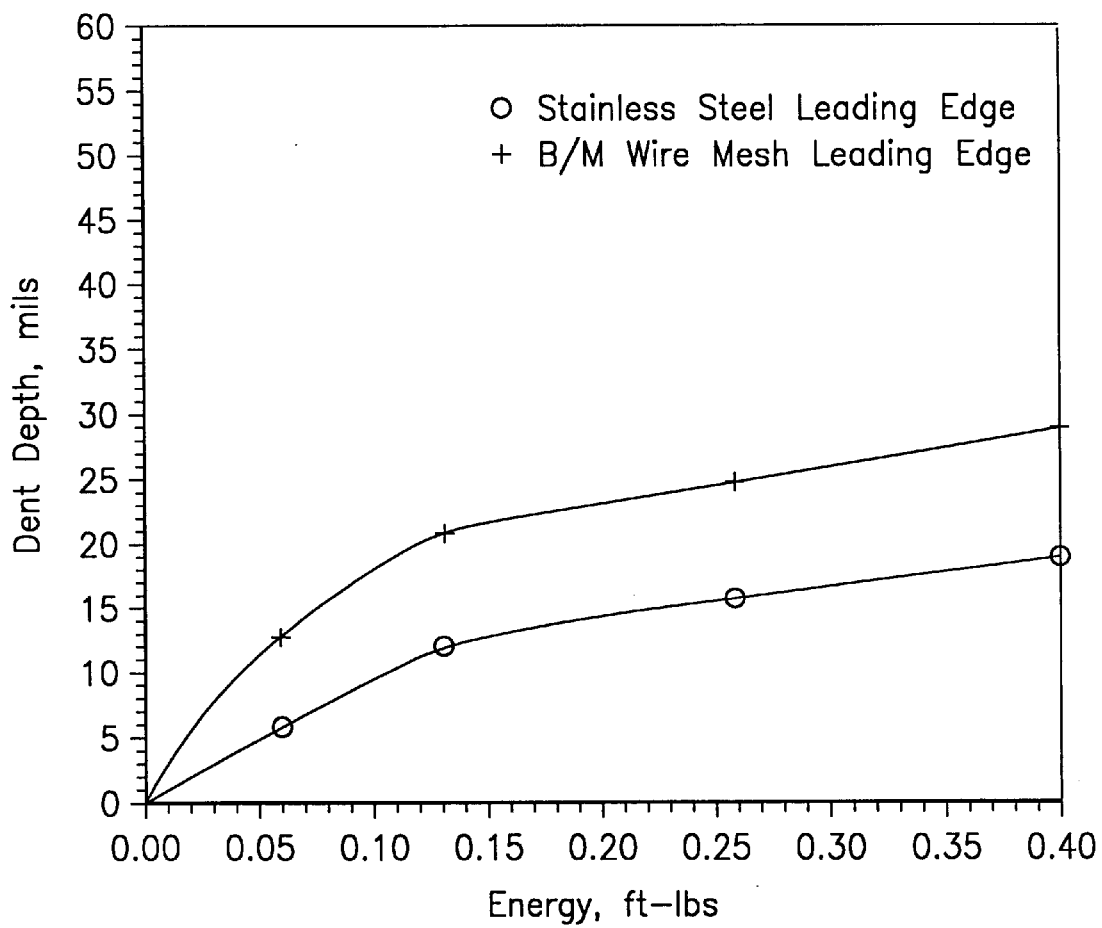
FIG. 3 is a graph showing the results of a ballistic test performed on fan exit guide vanes having wire mesh and stainless steel leading edges.

Referring to the drawings, FIGS. 1 and 2 illustrate a leading edge portion of a composite structure 10, such as a fan exit guide vane, formed using the method of the present invention. The composite structure 10 includes a core structure 12 formed from a non-metallic composite material, preferably in an uncured or substantially uncured state, a layer 14 of fluoroelastomer film material, also preferably in an uncured or substantially uncured state, having a cure temperature substantially close to the cure temperature of the core structure, and a metallic structure 16 placed over a leading edge portion 18 of the core structure.

When the composite structure 10 is to be used as a fan exit guide vane, the core structure 12 may be formed from a composite graphite—epoxy material having a cure temperature of about 350° F. (177° C.). The material may be in an uncured or substantially uncured state and may consist of one or more core plies 20 and one or more shell plies 22. Typically, all of the plies 20 and 22 will be formed from the same composite material. The core structure 12 may have any desired shape and any desired thickness. When the composite structure is to be used as an airfoil structure such as a fan exit guide vane, the core structure 12 preferably has an aerodynamic shape.

The fluoroelastomer film layer 14 may be formed from a VITON film having a cure temperature of about 350° F. (177° C.), which film may be in an uncured or substantially uncured state. The film layer has a typical thickness of about 0.008 to about 0.015 inches (about 0.02 to about 0.038 centimeters). A suitable VITON film is a fluoroelastomer product manufactured by Eagle Elastomer of Cuyahoga Falls, Ohio. (VITON is a trademark of duPont.) The fluoroelastomer film layer 14 acts as an adhesive and may be applied to the surface 24 of the core structure 12 using any suitable technique known in the art. For example, the fluoroelastomer film material may be brushed or otherwise painted onto the surface 24 of the leading edge of the core structure. If desired, the fluoroelastomer film layer may be applied so that it extends to portions of the surface 24 beyond the leading edge of the structure 10. In order to provide improved protection against erosion and against foreign object damage, a metal structure or metal sheath 16 is placed over the leading edge portion 18 of the composite structure. The metal structure 16 may be formed from an iron based alloy material such as AMS 5510 or a nickel based alloy material such as AMS 5536 or AMS 5599.

It is preferred that the metal structure 16 be a solid structure because solid structures provide better protection against erosion and foreign object damage. When used as a leading edge structure, the metal structure 16 typically will have a V-shape and a thickness in the range of from about 0.005 to about 0.012 inches (about 0.013 to about 0.03 centimeters).

To form a composite structure, the fluoroelastomer adhesive material 14 is first applied to outer surface portions 24 of the core structure 12. As discussed above, the adhesive material may be applied in film form on the surface portions 24.

Prior to being placed over the adhesive layer 14, the metal leading edge structure 16 is subjected to a critical preparation process which activates inner surfaces 26 of the metal structure 16 and thereby greatly improves the bond that is formed between the metal structure 16 and the core structure 12. The critical preparation process comprises cleaning inner surfaces 26 of the metal structure 16, etching the inner surfaces 26 so as to remove any oxides and to provide a fresh surface for bonding, and priming the inner surfaces 26 so as to prevent the formation of oxides and thereby improve the peel strength of the bond that is ultimately formed.

In a preferred preparation process, the inner surfaces 26 of the metal structure 16 are first wiped clean using a clean, unsized cheesecloth dampened with any suitable solvent such as reagent grade isopropyl alcohol or acetone. After wiping, the inner surfaces may be either air dried at ambient temperature or oven dried at a maximum temperature of 250° F. (121° C.). The drying time should be sufficient to remove any traces of the cleaning solvent which may be detrimental to the bonding process.

Thereafter, the inner surfaces 26 are etched using a ferric chloride acid etch solution to remove any oxides on the surfaces and to provide a fresh surface for bonding. Prior to the application of the etching solution, the metallic structure 16 is immersed in an alkaline cleaning solution such as a solution containing an alkaline cleaner sold under the trade name Blue Gold Industrial Cleaner or an equivalent alkaline cleaner in a volume of 5 oz. per gallon. The metallic structure is immersed in the solution for at least 5 minutes. The solution is preferably maintained at a temperature in the range of about 120° F. (49° C.) to about 160° F. (71° C.). After removal from the alkaline cleaning solution, the metallic structure 16 is rinsed in cold water for 20 to 40 seconds.

Etching of the inner surfaces 26 of the metallic structure is carried out by immersing the metallic structure in a ferric chloride acid etching solution. The etching solution may be made up by providing 80 gallons (302.4 liters) of hydrochloric acid and adding 135 lbs. (61.3 kgs) of anhydrous ferric chloride in small increments and maintaining the mixing tank temperature below 120° F. (49° C.). After the solution has cooled to a temperature of about 90° F. (32° C.), 2 gallons (7.56 liters) of nitric acid and 11 gallons (41.6 liters) of water are added. The etching operation is preferably carried out at room temperature for about 14 to 16 minutes. If necessary, the inner surfaces 26 may be abrasively or grit blasted with 240 mesh aluminum oxide at 20 psi (1.4 kg/cm$^2$) pressure prior to initiating etching.

After the etching operation has been completed, the metallic structure is rinsed in cold water for 20 to 40 seconds and thereafter power water flushed with cold water. The surfaces 26 are then inspected for smut or other deleterious particles. If smut or other deleterious particles are found, they are preferably manually removed with a suitable wipe. Thereafter, the metallic structure is subjected to another power water flush with cold water. After rinsing, the metallic structure 16 is preferably placed in an oven and dried at a temperature in the range of about 140° F. (60° C.) to about 160° F. (71° C.) for a time period in the range of from about 14 to about 16 minutes.

As a final preparation step, the inner surfaces 26 are primed so as to prevent oxidation of the surfaces and improve bonding. The priming operation consists of applying an epoxy resin solution containing an insoluble corrosion inhibitor such as strontium chromate to the inner surfaces 26. Any suitable technique known in the art may be used to apply the priming epoxy resin solution to the surfaces 26. The primer must be cured at the suitable conditions (such as air at 250° F. (121° C.) for 30 minutes).

After the surface preparation treatment has been completed, the metallic structure 16 is placed over the leading edge portion of the core structure 12 with the inner surfaces 26 of the metallic structure contacting the fluoroelastomer adhesive material 14. The entire composite structure is then placed in a mold such as a compression mold (not shown) and subjected to heat and pressure for a time period of 30 minutes to effect co-curing of the epoxy-graphite material forming the core structure 12 and the fluoroelastomer adhesive material 14 and to create a relatively strong bond between the etched and primed inner surfaces 26 of the metallic structure 16 and the fluoroelastomer adhesive material 14. The pressure which is applied to the composite structure should preferably be in the range of from about 100 psi (7 kg/cm$^2$) to about 1000 psi (70 kg/cm$^2$). The temperature which is applied to the composite structure in the mold should not exceed 360° F. (182° C.). Typically, a temperature of about 350° F. (177° C.) is used during the co-curing and bonding operation.

It has been found that the combination of cleaning, etching and priming steps performed on the metallic structure 16 are critical to achieving a successful bond during the molding operation. It also has been found that the co-curing of the core structure material and the adhesive layer material eliminates the need for a secondary bonding operation. As a consequence of this, the cost of producing the composite structure is greatly reduced. The end result of the method of the present invention is a well bonded metal sheath on the leading edge of a composite structure, such as a fan exit guide vane, which improves erosion and foreign object damage protection.

It has been known in the industry for some time that bonding to stainless steel is very difficult. The method of the present invention allows bonding to stainless steel materials such as AMS 5510 and the accomplishment of peel strengths in the range of about 20–70 lbs/inch width (3.58–12.5 kg/cm width) with failures occurring primarily within the VITON adhesive layer.

It has been found that a leading edge formed using a stainless steel material such as AMS 5510 is particularly advantageous. This has been demonstrated using a small particle ballistic test. In this test, 0.125 inch (0.32 centimeter) diameter steel ball bearings were fired at the leading edge of fan exit guide vanes having either a 0.012 inch (0.03 cm) thick wire mesh leading edge or a 0.010 inch (0.025 cm) thick stainless steel leading edge. FIG. 3 shows the improvement in small particle impact that the stainless steel leading edge provides as compared to a wire mesh leading edge. The wire mesh leading edge was punctured at particle energies of 0.25 ft-lb. (0.035 kg-m). The stainless steel leading edge was impacted with particles having energy levels up to 0.6 ft-lb. (0.083 kg-m) with no puncture. The stainless steel leading edge provides approximately a 40% reduction in dent depth when compared to the wire mesh leading edge at an energy of 0.25 ft-lb (0.035 kg-m). More important than dent depth, when compared to the wire mesh leading edge, the stainless steel leading edge demonstrated a margin of greater than 140% in the energy required to puncture.

In order to demonstrate the improved peel strengths obtainable using the method of the present invention attributable to the ductile nature of the fluoroelastomer film, a number of composite material test specimens were removed from the leading edge of molded fan exit guide vanes. Each test specimen consisted of a composite structure having an epoxy-graphite core material in an uncured state, an intermediate layer of a VITON adhesive material in an uncured state, and a layer of AMS 5510 stainless steel material, which had been subjected to the preparation process described hereinabove, placed over the layer of adhesive material. Each test specimen was placed in a vane compression mold and subjected to a pressure of 500 psi (35 kg/cm$^2$) and a temperature of 350° F. (177° C.) for 30 minutes to co-cure the core material and the VITON adhesive material and to bond the stainless steel layer to the VITON material layer.

Several of the test specimens were subjected to different conditions. One test specimen was subjected to humidity conditions (140° F. (60° C.)/95%RH/14 days). Two test specimens were aged at 250° F. (121° C.) for 500 hours. Another two test specimens were thermal cycled at temperatures in the range of 0° F. (−18° C.) to 250° F. (121° C.) for 100 cycles. Thereafter, the peel strength for each specimen was determined as per ASTM D3167. It was found that: as fabricated test specimens had peel strengths at 75° F. (24° C.) in the range of 16 to 32 lbs/inch (2.86 to 5.73 kg/cm) width; the humidity tested specimen had a peel strength at 75° F. (24° C.) of 46 lbs/inch (8.23 kg/cm) width; the aged test specimens had peel strengths at 75° F. (24° C.) of 27 lbs/inch width (4.83 kg/cm width) and 41 lbs/inch width (7.34 kg/cm width); and the cycled test specimens had peel strengths at 75° F. (24° C.) of 18 lbs/inch width (3.72 kg/cm width) and 21 lbs/inch width (3.76 kg/cm width).

Testing has also shown that the fatigue strength of composite fan exit guide vanes with a stainless steel leading edge formed in accordance with the method of the present invention are greater than that of composite fan guide exit vanes formed in accordance with prior art techniques and a wire mesh leading edge.

While the core structure 12 is preferred to be in an uncured or substantially uncured state, the method of the present invention can be performed with a cured core material such as a cured graphite-epoxy material.

While the method of the present invention has been described in the context of putting a leading edge on an airfoil structure, it should be recognized that the method could be used in general metal to composite material bonding applications and should therefore not be limited to the embodiments shown herein. It is also applicable to other metals (titanium, aluminum, nickel) with appropriate surface preparations for adhesive bonding. It should also be recognized that the method has utility in original equipment manufacture processes as well as repair processes.

It is apparent that there has been provided in accordance with this invention a metal/composite bonding method which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and the broad scope of the appended claims.

What is claimed is:

1. A composite article comprising:
    a core structure formed from a non-metallic composite material;
    an adhesive material positioned over a portion of said core structure;
    said adhesive material comprising a fluoroelastomer film material having a cure temperature substantially close to the cure temperature of said core structure; and
    a metallic structure having an inner surface, said metallic structure being positioned over said core structure so that said inner surface is in contact with said fluoroelastomer film adhesive material.

2. The composite article of claim 1 wherein said core structure and said fluoroelastomer film material each have a cure temperature of about 350° F.

3. The composite article of claim 1 wherein said core structure is formed by a composite graphite-epoxy material in an uncured or substantially uncured state and said fluoroelastomer film material is formed by a material based on a copolymer of vinylidene fluoride and hexafluoropropylene in a cured or uncured state.

4. The composite article of claim 3 wherein said metallic structure is formed from an iron-based alloy.

5. The composite article of claim 3 wherein said metallic structure is formed from a stainless steel.

6. The composite article of claim 3 wherein said metallic structure is formed from a nickel-based alloy.

7. The composite article of claim 1 wherein said article comprises an airfoil and said metallic structure forms a leading edge for said airfoil.

8. The composite article of claim 1 wherein said core structure and fluoroelastomer film material are co-cured.

9. The composite article of claim 1 wherein said inner surface is cleaned, etched, and primed so as to improve the bond formed between said metallic structure and said fluoroelastomer adhesive film material.

* * * * *